United States Patent
Tsumura et al.

(10) Patent No.: US 6,866,960 B2
(45) Date of Patent: Mar. 15, 2005

(54) ELECTRODES FOR FUEL CELL AND PROCESSES FOR PRODUCING THE SAME

(75) Inventors: Naohiro Tsumura, Kyoto (JP); Shuji Hitomi, Kyoto (JP); Hideo Yasuda, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 191 days.

(21) Appl. No.: 09/907,937

(22) Filed: Jul. 19, 2001

(65) Prior Publication Data

US 2002/0015878 A1 Feb. 7, 2002

(30) Foreign Application Priority Data

Jul. 21, 2000 (JP) .................................... P. 2000-220977

(51) Int. Cl.[7] .............................................. H01M 4/86
(52) U.S. Cl. .............................. 429/42; 429/40; 429/41; 501/180
(58) Field of Search ...................... 429/40–42; 502/100, 502/102, 180

(56) References Cited

U.S. PATENT DOCUMENTS

| | | | | |
|---|---|---|---|---|
| 4,430,391 A | * | 2/1984 | Ovshinsky et al. | 429/40 |
| 4,868,073 A | * | 9/1989 | Hashimoto et al. | 429/40 |
| 5,294,232 A | | 3/1994 | Sakairi et al. | |
| 6,066,410 A | * | 5/2000 | Auer et al. | 429/40 |
| 6,344,291 B1 | | 2/2002 | Hitomi | |

FOREIGN PATENT DOCUMENTS

| EP | 0 920 065 A1 | 2/1999 |
|---|---|---|
| JP | 2000-173626 A | 6/2000 |

OTHER PUBLICATIONS

John Payne, in www.psrc.usm.edu/mauritz/nation.html.*

Naohiro Tsumura et al., Development of Ultra–low Pt–Ru Binary Alloy Loading Gas Diffusion Electrode for PEFC, The 41st Battery Symposium in Japan (2000), pp. 116–117.

H.F. Oetjen et al., Performance Data of a Proton Exchange Membrane Fuel Cell Using $H_2/CO$ as Fuel Gas, J. Electrochem. Soc., vol. 143, (1996), pp. 3838–3842.

Shuji Hitomi et al., New Conceptual Low Platinum Loading Gas Diffusion Electrode, The 40th Battery Symposium in Japan, (1999), pp. 167–168.

Shuji Hitomi et al., New Conceptual Ultra Low Platinum Loading Gas Diffusion Electrode, The 3rd International Fuel Cell Conference, (1999), pp. 111–114.

* cited by examiner

*Primary Examiner*—Carol Chaney
(74) *Attorney, Agent, or Firm*—Sughrue Mion, PLLC

(57) ABSTRACT

An electrode for a fuel cell of the invention comprises a cation-exchange resin, carbon particles and a catalyst metal which is amorphous. The electrode has high activity, a high catalyst utilization and high CO tolerance and is highly active in the electrochemical oxidation reaction of methanol. Furthermore these qualities of the electrode were extremely improved when the catalyst metal was loaded mainly on sites where the surface of the carbon particles contacts proton-conductive passages in the cation-exchange resin. Consequently, a fuel cell with the electrode of the invention has a high output current and a long life, and can be produced at low cost.

46 Claims, 6 Drawing Sheets

ELECTRODES FOR FUEL CELL AND PROCESSES FOR PRODUCING THE SAME

FIELD OF THE INVENTION

The present invention relates to electrodes for fuel cells and to processes for producing the electrodes.

DESCRIPTION OF THE RELATED ART

A polymer electrolyte fuel cell (PEFC) is an apparatus which employs, as an electrolyte, a cation-exchange membrane of a solid polymer electrolyte, e.g., a perfluorocarbonsulfonic acid film, and has a constitution that an anode and a cathode are bonded to the respective sides of this ion-exchange membrane, and hydrogen and oxygen are supplied respectively to the anode and the cathode to generate electricity through electrochemical reactions. The electrochemical reactions occurring at the electrodes are as follows.

Anode: $H_2 \rightarrow 2H^+ + 2e^-$

Cathode: $1/2\ O_2 + 2H^+ + 2e^- \rightarrow H_2O$

Overall reaction: $H_2 + 1/2\ O_2 \rightarrow H_2O$

As is apparent from the reaction formulae given above show, the reactions at the electrodes proceed only at three-phase boundaries where the transfer of the gas as the active material (hydrogen or oxygen) occurs simultaneously with the transfer of protons ($H^+$) and electrons ($e^-$).

Examples of the electrodes for fuel cells which have such functions is an electrode for fuel cells which comprises a cation-exchange resin serving as a solid polymer electrolyte, a carbon particle, and a catalyst metal. An example of the structure of such electrode for fuel cells is shown in FIG. 10, wherein numeral 101 denotes a carbon particle, 102 a cation-exchange resin, 103 an ion-exchange membrane, and 104 a pore.

As FIG. 10 shows, this electrode has carbon particles 101 having a catalyst metal supported thereon and a cation-exchange resin 102, which are mixed with each other so that these ingredients are three-dimensionally distributed. This electrode is a porous one having pores 104 in inner parts thereof. The carbon particles 101 serving as a catalyst support form electron-conductive channels, while the cation-exchange resin 102 forms proton-conductive channels. Furthermore, the pores 104 form feed/discharge channels through which oxygen gas or hydrogen gas is supplied and the water yielded as a reaction product is discharged. These three kinds of channels are three-dimensionally distributed in the electrode to form innumerable three-phase boundaries where gas transfer and the transfer of protons ($H^+$) and electrons ($e^-$) can occur simultaneously. Thus, sites for electrode reactions are provided.

Electrodes having such a structure have conventionally been produced, for example, by the following two methods. In the first method, particles of a catalyst metal such as platinum are highly dispersedly fixed to carbon particles as a support to obtain carbon particles supporting catalyst. A paste comprising these carbon particles supporting catalyst and a dispersion of PTFE (polytetrafluoroethylene) particles is applied to a polymer film or a carbon electrode substrate serving as a conductive porous material to form a film of the paste (generally having a thickness of from 3 to 30 μm), and this wet film is dried by heating. Thereafter, a solution of a cation-exchange resin is applied to the resultant film to impregnate it with the solution, and the impregnated film is dried to produce the electrode.

In the second method, carbon particles supporting catalyst are prepared first by fixing catalyst metal particles with high dispersion in the same manner as in the above-described method. A paste comprising these carbon particles supporting catalyst and a solution of a cation-exchange resin and optionally further containing PTFE particles is applied to a polymer film or a carbon electrode substrate serving as a conductive porous material to form a film of the paste (generally having a thickness of from 3 to 30 μm). This wet film is dried to produce the electrode. The solution of a cation-exchange resin used in these methods is a liquid prepared by dissolving a perfluorocarbonsulfonic acid or the like having the same composition as the ion-exchange membrane mentioned above in an alcohol. The dispersion of PTFE particles used is a dispersion of PTFE particles having a particle diameter of about 0.23 μm.

However, the electrode produced by either of the methods described above has a low utilization of the catalyst metal supported on the carbon. For example, it has been reported that the catalyst metal utilization therein is as low as about 10% (see Edson A. Ticianelli, J. Electroanal. Chem., 251, 275 (1988)). Accordingly, the electrode as a whole has further reduced activity in the electrode reactions.

The low catalyst utilization is due to the conventional processes for catalyst production, in which particles of a catalyst metal such as platinum are fixed to carbon particles before an electrode is produced therefrom.

The following explanation is given in a report presented by H. L. Yeager et al. (J. Electrochem. Soc., 128, 1880, (1981)) and in a report presented by Okuimi et al. (J. Electrochem. Soc. 132, 2601 (1985)). When the structure of the cation-exchange resin in an electrode for fuel cells is microscopically viewed, the cation-exchange resin has parts which contain hydrophilic exchange groups such as sulfo groups and form proton-conductive passages and hydrophobic parts which are framework parts having perfluoroalkyl groups or the like. The proton-conductive passages are formed as an aggregation of sulfo groups or the like, counter ions therefor, and water, which is called a cluster.

Although the reactant gas (hydrogen or oxygen) and the water which is the reaction product yielded at the cathode, as well as protons, move through the proton-conductive passages, the hydrophobic parts having perfluoroalkyl groups or the like cannot serve as such passages. Accordingly, three-phase boundaries at which the reactions required for an electrode for fuel cells are present only at sites where the proton-conductive passages in the cation-exchange resin contact the surface of the carbon particles.

However, the conventional processes for electrode production have the following problems. An example of the electrodes produced by the conventional processes is shown in the diagrammatic view of FIG. 11, As shown in the figure, a surface layer of a carbon particle 111 is covered by a cation-exchange resin having proton-conductive passages 112 and framework parts 113, and catalyst metal particles 114 and 115 are supported on the surface of the carbon particle 111. The catalyst metal particles 115 are located in the proton-conductive passages 112 in the cation-exchange resin and, hence, effectively function as a catalyst in electrode reactions. However, the catalyst metal particles 114 are located in the framework parts 113 and hence it is considered that the metal particles 114 do not effectively function as a catalyst.

Furthermore, the regions Z in FIG. 11 have three-phase boundaries but no catalyst metal particles are present therein. Thus, it is considered that these regions do not participate in reactions. Namely, in such an electrode, the presence of the catalyst metal particles 114, which do not effectively function, causes a decrease in the utilization of the catalyst metal. Furthermore, the presence of the three-phase boundaries Z, which do not participate in reactions, causes a decrease in electrode activity.

As described above, the production of an electrode for fuel cells by the conventional processes results in catalyst metal particles 114 which do not effectively function as a catalyst. Since the catalyst metal particles 114 are particles of a metal belonging to the platinum group and are expensive, a polymer electrolyte fuel cell employing this electrode requires high costs and this is an obstacle to practical use. Accordingly, investigations for technical developments have been concentrated on how to reduce the amount of a platinum-group metal to be supported as a catalyst metal on an electrode.

Under these circumstances, the present inventor produced an electrode for fuel cells by a method characterized by fixing a catalyst metal mainly to sites where proton-conductive passages in a cation-exchange resin contact the surface of carbon particles, and thereby succeeded in greatly improving the catalyst utilization. The structure of this electrode will be explained below by reference to an example shown in FIG. 12.

FIG. 12 is a diagrammatic view illustrating the state of a surface layer of a carbon particle in contact with the cation-exchange resin in that electrode.

As shown in FIG. 12, this carbon particle 121 has such a structure that a surface layer of the carbon particle 121 is covered with the cation-exchange resin and catalyst metal particles 125 are supported at sites where proton-conductive passages 122 in the cation-exchange resin contact the surface of the carbon particle 121. None of the catalyst metal particles 125 is supported on the framework parts 123 comprising perfluoroalkyl groups or the like. Since many catalyst particles are hence supported at three-phase boundaries formed on the carbon particle surface layer, the utilization of the catalyst metal is improved.

The electrode described above is produced by the following method. First, a no-catalyzed electrode is formed with a mixture of a cation-exchange resin and carbon particles. This no-catalyzed electrode is immersed in a solution of cations containing a catalyst metal element. Upon the immersion, the counter ions for the hydrophilic exchange groups, such as sulfo groups, in the no-catalyzed electrode are replaced with the cations. Namely, the cations containing a catalyst metal element are adsorbed into hydrophilic exchange groups of the cation-exchange resin. Thereafter, the cations absorbed into the cation-exchange resin is reduced at 180° C. for 4 hours with hydrogen gas. As a result, the cations are reduced to the catalyst metal. Consequently, the catalyst metal becomes fixed mainly at sites where hydrophilic exchange groups such as sulfo groups are present, whereby the catalyst metal utilization is improved.

The technique described above attained an improvement in the utilization of a catalyst metal. However, for the practical use of a polymer electrolyte fuel cell (PEFC), it is indispensable to develop an electrode for fuel cells which not only has an improved output current density and an improved life but can be produced at low cost.

Accordingly, an object of the invention is to provide an electrode for fuel cells which comprises a cation-exchange resin, carbon particles, and a catalyst metal having a high catalytic activity and efficiently supported on sites where the surface of the carbon particles contacts proton-conductive passages, and which has a high output current density and a long life and can be produced at low cost.

SUMMARY OF THE INVENTION

The invention is based on the findings that when the catalyst metal is amorphous in an electrode for fuel cells wherein the electrode comprises a cation-exchange resin, carbon particles and a catalyst metal, then the electrode shows extremely high catalytic activity in the electrochemical reduction of oxygen and has high CO tolerance and that when the catalyst metal has a mean particle diameter of 1.5 nm or smaller, then the electrode shows high catalytic activity. The invention is further based on the finding that it is possible to improve the performances of the foregoing electrode with the catalyst metal which is amorphous or which has a mean particle diameter of 1.5 nm or smaller by fixing the catalyst metal mainly to sites where the surface of carbon particles contacts proton in the electrode, even when the amount of the catalyst metal contained therein is extremely small.

The first embodiment of the present invention provides an electrode for fuel cells, wherein the electrode comprises a cation-exchange resin, carbon particles, and a catalyst metal, wherein the catalyst metal is amorphous. This electrode has high catalytic activity and satisfactory CO tolerance. This is because the amorphous state of the catalyst metal serves to improve the catalytic activity in electrochemical oxygen reduction and the CO tolerance which are possessed by the catalyst metal.

The second embodiment of the present invention provides an electrode for fuel cells, wherein the electrode comprises a cation-exchange resin, carbon particles, and a catalyst metal, wherein the catalyst metal has a mean particle diameter of 1.5 nm or lower.

In conventional electrodes, a metal belonging to the platinum group is supported on a carbon and is used as a catalyst metal. The activity of such an electrode highly depends on the surface area of the catalyst metal. It can therefore be thought that catalytic activity may be enhanced by reducing the particle diameter of the catalyst metal to increase surface area per unit weight. However, it has been reported that as the particle diameter of the catalyst metal belonging to the platinum group decreases to below the range of 2.5 to 3.5 nm, the catalytic activity of the metal per unit weight decreases due to the particle size effect (see K. Kinioshita, J. Electrochem. Soc., 137, 845 (1990)). Consequently, the catalyst metals currently used are a platinum-group metal having a mean particle diameter of about from 2.5 to 4 nm and highly dispersedly supported on carbon particles. In order for such conventional electrodes to have sufficient properties in practical use as a cathode or an anode, the amount of the platinum-group metal supported on the cathode or the anode should be as large as 0.4 mg/cm$^2$ or higher or 0.1 mg/cm$^2$ or higher, respectively. In contrast, the electrodes of the invention are free from the particle size effect and show high activity even when the catalyst particle diameter is 1.5 nm or lower, preferably from 0.5 to 1.5 nm, although the reason for this is unclear.

In the electrodes for fuel cells of the invention, the amount of the catalyst metal loaded on sites where the surface of the carbon particles contacts proton-conductive passages in the cation-exchange resin is preferably higher than 80% by weight of the total amount of all the catalyst metal loaded. The higher the amount of the catalyst metal loaded on those sites, the more the electrode is preferred. It is especially preferred that the amount thereof is higher than 90% by weight. When the amount of the catalyst metal loaded on sites where the surface of the carbon particles contacts proton-conductive passages in the cation-exchange resin is large, this means that a large proportion of the catalyst metal catalyzes electrode reactions and, hence, an electrode for a fuel cell having high output can be obtained.

Although the catalyst metal may be an elemental metal belonging to the platinum group, it is preferably an alloy comprising one or more elements belonging to the platinum group. More preferably, the catalyst metal comprises platinum element and ruthenium element. Use of a catalyst metal comprising a metal element belonging to the platinum group is preferred in that this catalyst metal has high catalytic activity in electrochemical oxygen reduction reaction and hydrogen oxidation reaction. Furthermore, use of a catalyst metal comprising platinum element and ruthenium element is effective in giving an electrode which, when used in a fuel cell employing a reforming gas containing a slight amount of CO, is highly inhibited from being influenced by the CO.

Furthermore, the catalyst metal preferably contains, in addition to platinum-group metals, at least one element selected from the group consisting of magnesium, aluminum, vanadium, chromium, manganese, iron, cobalt, nickel, copper, zinc, silver, and tungsten. This catalyst metal is advantageous in that the amount of a platinum-group metal used can be lowered and the catalyst metal can have satisfactory CO tolerance and high activity in oxygen reduction reaction.

The amount of the catalyst metal contained in the electrode is preferably 0.1 mg or lower per $cm^2$ of the electrode. Furthermore, the amount of the platinum-group metal element contained in the electrode is preferably 0.05 mg or lower per $cm^2$ of the electrode. In conventional electrodes for fuel cells, the catalyst metals used therein are a platinum-group metal having an mean particle diameter of about from 2.5 to 4 nm and highly dispersedly supported on carbon particles. Accordingly, in order for such conventional electrodes to have sufficient properties in practical use as a cathode or an anode, the amount of the platinum-group metal supported on the cathode or the anode should be as large as 0.4 mg/$cm^2$ or higher or 0.1 mg/$cm^2$ or higher, respectively. In contrast, the electrodes of the invention are free from the particle size effect and show high activity even when the catalyst particle diameter is 1.5 nm or lower, preferably from 0.5 to 1.5 nm, although the reason for this is unclear. Consequently, the catalyst metal has a large surface area per unit weight, and the electrodes can have sufficiently high activity and sufficient CO tolerance even when the amount of the catalyst supported thereon is small. An especially preferred electrode is one in which the amount of the catalyst metal contained therein is 0.1 mg or lower per $cm^2$ of the electrode and the amount of the platinum-group metal element contained therein is 0.05 mg or lower per $cm^2$ of the electrode, because this electrode has high catalytic activity per unit weight. Even when the amount of the catalyst metal exceeds 0.1 mg/$cm^2$ or the amount of the platinum-group metal element exceeds 0.05 mg/$cm^2$, the excess catalyst metal does not so effectively function, resulting in an increase in cost.

The electrodes for fuel cells of the invention described above are produced, for example, by the following processes. The first process for producing an electrode for fuel cells comprises the following steps. First, a mixture of a cation-exchange resin and carbon particles is formed into a no-catalyzed electrode (formation step). Subsequently, this no-catalyzed electrode is immersed in a solution containing cations of a catalyst metal element, thereby the cations are absorbed into the cation-exchange resin based on the ion-exchange reaction of the cations with counter ions of the cation-exchange resin (adsorption step). Thereafter, the cations adsorbed into the cation-exchange resin are reduced for 10 hours or longer in a gaseous atmosphere comprising hydrogen gas resulting formation of the catalyst metal (reduction step).

The second process for producing an electrode for fuel cells comprises the following steps. First, a mixture of a cation-exchange resin and carbon particles is formed into a no-catalyzed electrode (formation step). Subsequently, this no-catalyzed electrode is immersed in a solution containing cations of a catalyst metal element, thereby the cations are absorbed into the cation-exchange resin based on the ion-exchange reaction of the cations with counter ions of the cation-exchange resin (adsorption step). Thereafter, the cations adsorbed into the cation-exchange resin are reduced in a gaseous atmosphere comprising hydrogen gas resulting formation of the catalyst metal (reduction step). Furthermore, the catalyst metal is aged in a gaseous atmosphere comprising an inert gas as the main component or an acid solution or alkaline solution (ageing step).

According to the processes of the present invention, cations of a catalyst metal element are predominantly adsorbed to proton-conductive passages in the cation-exchange resin by the ion-exchange reaction of counter ions of the cation-exchange resin with the cations of a catalyst metal element. The cations of a catalyst metal element adsorbed are reduced to yield the catalyst metal. In this step, the carbon particles show catalytic activity in the reduction of the cations of a catalyst metal element. When the cations of a catalyst metal element are reduced in a gaseous atmosphere comprising hydrogen gas for 10 hours or longer at sites where the surface of the carbon particles contacts proton-conductive passages in the cation-exchange resin, then the cations become an amorphous metal, a metal having a mean particle diameter of 1.5 nm or lower, or an amorphous metal having a mean particle diameter of 1.5 nm or lower. Although the time period of reduction with a gas comprising hydrogen gas in the first process is 10 hours or longer, it is preferably 200 hours or longer. This is because the cations of a catalyst metal element which have been adsorbed in the adsorption step are sufficiently reduced in such a reduction period and the metal obtained by this reduction has been greatly improved on the catalytic activity.

In the second process, a catalyst metal formed on a no-catalyzed electrode through a adsorbing step and a reduction step is aged in a gaseous atmosphere comprising an inert gas as the main component or an acid solution or alkaline solution, whereby the metal becomes an amorphous metal, a metal having a mean particle diameter of 1.5 nm or lower, or an amorphous metal having a mean particle diameter of 1.5 nm or lower.

In the first process or second process, the reduction step or ageing step is preferably conducted at a temperature of 200° C. or lower in order to prevent the cation-exchange resin from deteriorating. The cation-exchange resin contained in the electrode produced by the first process or second process is not particularly limited in ion-exchange capacity. However, the ion-exchange capacity thereof is preferably 2.5 meq/g or lower from the standpoint of obtaining a catalyst metal having high activity, and is more preferably 1.0 meq/g or lower from the standpoint of obtaining a catalyst metal having higher activity. In the first process or second process, the cations of a catalyst metal element (e.g., $[Pt(NH_3)_4]^{2+}$) unreduced in the electrode after the reduction step are preferably recovered from the electrode by immersing the electrode in an acid aqueous solution. This operation can reduce the cost of production of electrodes for fuel cells.

When these electrodes for fuel cells are used as an anode and/or a cathode, a fuel cell which has a high output current density and a long life and is less susceptible to CO poisoning can be obtained at low production cost.

DETAILED DESCRIPTION OF THE INVENTION

Figure 1:
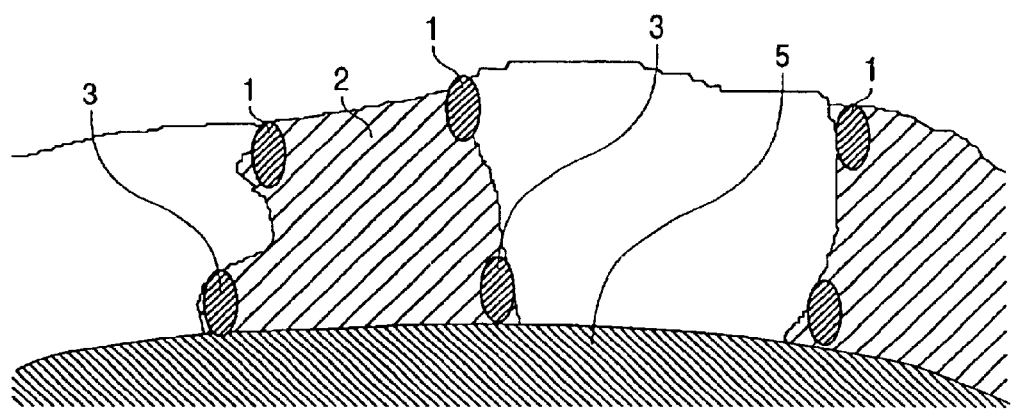
FIG. 1 is a diagrammatic view showing the state of a surface layer of a carbon particle.

The electrodes for fuel cells of the invention, which comprise a cation-exchange resin, carbon particles, and a catalyst metal, have been accomplished based on a new finding that an electrode for fuel cells which comprises these components shows exceedingly high catalytic activity in the electrochemical reduction of oxygen and high CO tolerance when the catalyst metal is amorphous, and that when the catalyst metal in such an electrode has a particle diameter of 1.5 nm or lower, then this electrode shows exceedingly high catalytic activity.

In the electrodes for fuel cells of the invention, the amount of the catalyst metal loaded on sites where the surface of the carbon particles contacts proton-conductive passages in the cation-exchange resin is preferably higher than 80% by weight or more of the total amount of all the catalyst metal loaded. The higher the amount of the catalyst metal loaded on those sites, the more the electrode is preferred. It is especially preferred that the amount thereof is higher than 90% by weight or more.

The amount of a catalyst metal loaded on sites where the surface of carbon particles contacts proton-conductive passages in a cation-exchange resin can be calculated in the following manner, based on the assumption that only the catalyst particles loaded on sites where the surface of the carbon particles contacts proton-conductive passages in the cation-exchange resin are electrochemically active.

First, the surface area of the electrochemically active catalyst metal is determined, for example, from charges for desorption of hydrogen adsorbed on the surface of the catalyst metal measured by cyclic voltammetry. Separately, the particle diameter of the catalyst metal is determined through examination with an electron microscope. From the value of particle diameter, the surface area per particle is calculated. Furthermore, since the metal used as the catalyst metal has a given specific gravity, the weight of the catalyst metal per particle can be determined.

The surface area of the electrochemically active catalyst metal is divided by the surface area per particle, whereby the number of electrochemically active particles can be determined. Multiplying this number of particles by the catalyst metal weight per particle gives the amount of the electrochemically active catalyst metal. This catalyst metal amount is the amount of the catalyst metal loaded on sites where the surface of the carbon particles contacts the proton-conductive passages. This catalyst metal amount is divided by the total amount of all the catalyst metal loaded on the electrode, whereby the proportion of the amount of the catalyst metal loaded on sites where the surface of the carbon particles contacts proton-conductive passages of the cation-exchange resin to the total amount of all the catalyst metal loaded can be determined. With respect to the particle diameter of a catalyst metal, it is preferred to use a mean particle diameter from the standpoint of ease of calculation.

The catalyst metal used in the electrodes of the invention is not particularly limited as long as it is a metal having high catalytic activity in electrochemical oxygen reduction reaction and hydrogen oxidation reaction. However, it is preferred to use an elemental metal belonging to the platinum group, such as platinum, rhodium, ruthenium, iridium, palladium, or osmium, or an alloy comprising one or more metals belonging to the platinum group. In particular, comprising platinum element and ruthenium element is preferred in the case of using a reforming gas containing a slight amount of CO because of improving CO tolerance of the electrode of the invention. Also preferred is comprising one or more metals belonging to the platinum group and at least one element selected from the group consisting of magnesium, aluminum, vanadium, chromium, manganese, iron, cobalt, nickel, copper, zinc, silver, and tungsten. This is because not only the amount of platinum-group metals to be used can be reduced but also this catalyst metal can be expected to have satisfactory CO tolerance and high activity in oxygen reduction reaction.

In conventional electrodes, a metal belonging to the platinum group and supported on a carbon is used as a catalyst metal. The activity of such an electrode highly depends on the surface area of the metal belonging to the platinum group. It can therefore be thought that catalytic activity may be enhanced by depositing a platinum-group metal having a reduced particle diameter and hence having an increased surface area per unit weight. However, it has been reported that as the particle diameter of a metal belonging to the platinum group decreases to below the range of 2.5 to 3.5 nm, the catalytic activity of the metal per unit weight decreases, rather than increases, due to the particle size effect (see K. Kinioshita, J. Electrochem. Soc., 137, 845 (1990)).

Consequently, the catalyst metals currently used are a platinum-group metal having a mean particle diameter of about from 2.5 to 4 nm and highly dispersedly supported on carbon particles. Accordingly, in order for such conventional electrodes to have sufficient properties in practical use as a cathode or an anode, the amount of the platinum-group metal supported on the cathode or the anode should be as large as 0.4 mg/cm$^2$ or higher or 0.1 mg/cm$^2$ or higher, respectively.

In contrast, the electrodes of the invention are free from the particle size effect and show high activity even when the catalyst particle diameter is 1.5 nm or lower, preferably from 0.5 to 1.5 nm, although the reason for this is unclear. Consequently, the catalyst metal in the electrodes of the invention can have an increased surface area per unit weight, and the electrodes can hence have sufficiently high activity and sufficient CO tolerance even when the amount of the catalyst supported thereon is small. An especially preferred electrode is one in which the amount of the catalyst metal contained therein is 0.1 mg or lower per $cm^2$ of the electrode and the amount of the platinum-group metal element contained therein is 0.05 mg or lower per $cm^2$ of the electrode, because this electrode has high catalytic activity per unit weight.

The cation-exchange resin is not particularly limited. Preferred examples thereof include perfluorocarbonsulfonic acid type cation-exchange resins and styrenedivinylbenzene-based sulfonic acid type cation-exchange resins. The cation-exchange resin contained in the electrodes is not particularly limited in ion-exchange capacity. However, the ion-exchange capacity thereof is preferably 2.5 meq/g or lower from the standpoint of obtaining a catalyst metal having high activity, and is more preferably 1.0 meq/g or lower from the standpoint of obtaining a catalyst metal having higher activity.

The carbon particles are preferably ones which are highly active in the reduction reaction of cations of a catalyst metal element. Especially preferred examples thereof include carbon blacks such as Denka Black, Vulcan XC-72, and Black Pearl 2000.

Production Processes

The electrodes for fuel cells of the invention described above are produced, for example, by the following processes. The first process for producing an electrode for fuel cells comprises the following steps. First, a no-catalyzed electrode is formed with a mixture of a cation-exchange resin and carbon particles (formation step). Subsequently, this no-catalyzed electrode is immersed in a solution containing cations containing a catalyst metal element, thereby the cations are absorbed into the cation-exchange resin based on the ion-exchange reaction of the cations with counter ions of the cation-exchange resin (adsorption step). Thereafter, the cations adsorbed in the cation-exchange resin are reduced for 10 hours or longer in a gaseous atmosphere comprising hydrogen gas resulting in formation of the catalyst metal (reduction step).

The second process for producing an electrode for fuel cells comprises the following steps. First, a no-catalyzed electrode is formed with a mixture of a cation-exchange resin and carbon particles (formation step). Subsequently, this no-catalyzed electrode is immersed in a solution containing cations containing a catalyst metal element, thereby the cations are absorbed into the cation-exchange resin based on the ion-exchange reaction of the cations with counter ions of the cation-exchange resin (adsorption step). Thereafter, the cations adsorbed in the cation-exchange resin are reduced in a gaseous atmosphere comprising hydrogen gas resulting in formation of the catalyst metal (reduction step). Furthermore, the catalyst metal is aged in a gaseous atmosphere comprising an inert gas as the main component or an acid solution or alkaline solution (ageing step).

Besides being used for producing an electrode for polymer electrolyte fuel cells (PEFCs), the processes described above are applicable to the production of an electrode for use in fuel cells of other structures.

The steps of each process will be explained below.

Production of No-catalyzed Electrode

In each of the first and second processes, a no-catalyzed electrode is prepared first from a mixture of a cation-exchange resin and carbon particles. The no-catalyzed electrode is a solid mass. For example, it is preferably a porous mass consisting of a mixture of dispersed ingredients comprising a cation-exchange resin and carbon particles and optionally containing PTFE particles. The no-catalyzed electrode especially preferably is a porous film in which the cation-exchange resin and the carbon particles are dispersed evenly and which has a thickness of preferably from 3 to 30 $\mu$m, more preferably from 3 to 20 $\mu$m. This no-catalyzed electrode is prepared, for example, by the following methods. A paste comprising carbon particles and a solution of a cation-exchange resin and optionally containing a dispersion of PTFE particles is applied to a polymer film to form into a film (preferably having a thickness of from 3 to 30 $\mu$m), and this film is dried to prepare the no-catalyzed electrode. Alternatively, the no-catalyzed electrode is prepared by applying a paste comprising carbon particles and a dispersion of PTFE particles to a polymer film to form into a film (preferably having a thickness of from 3 to 30 $\mu$m), applying a solution of a cation-exchange resin to the resultant film and then drying the film. In still another method, a paste comprising carbon particles and a solution of a cation-exchange resin and optionally containing a dispersion of PTFE particles is applied to a carbon electrode substrate which is a conductive porous material and then dried to prepare the no-catalyzed electrode. In a further method, the no-catalyzed electrode is prepared by applying a paste comprising carbon particles and a dispersion of PTFE particles to a carbon electrode substrate which is a conductive porous material, drying the coating film by heating, applying a solution of a cation-exchange resin to the resultant film and then drying the film. Also usable is a no-catalyzed electrode which is formed by any of methods described above is bonded to one or each side of a cation-exchange membrane.

Adsorption Step

The no-catalyzed electrode is immersed in a solution comprising cations containing a catalyst metal element. Upon immersion in the solution, an ion-exchange reaction occurs between the counter ions for the exchange groups of the cation-exchange resin and the cations, whereby the cations can be adsorbed into the cation-exchange resin of the no-catalyzed electrode. The solution comprising cations containing a catalyst metal element to be used in this step is prepared, for example, by dissolving, in an aqueous solution or alcohol-containing solution, a compound which generates cations of a catalyst metal element. An alcohol with four carbon atoms or lower. for example methanol, ethanol, 1-propanol, 2-propanol, 1-butanol, 2-butanol or a mixture of two or more of these alcohols, may be used as the alcohol of the foregoing alcohol-containing solution. The term "cations of a catalyst metal element" as used herein means cations which upon reduction can become a catalyst metal. These cations are preferably ones which, upon reduction, form particles of a metal belonging to the platinum group, such as, e.g., platinum, rhodium, ruthenium, iridium, palladium, or osmium. This is because these metals have high catalytic activity in electrochemical oxygen reduction reaction and hydrogen oxidation reaction. The catalyst metal formed by the reduction of the cations is not particularly limited in the electrode, etc., as long as it functions as a catalyst. Especially preferred examples of the form of the cations of a catalyst metal element include platinum-group metal complex ions such as platinum ammine complex ions represented by $[Pt(NH_3)_4]^{2+}$ or $[Pt(NH_3)_6]^{4+}$ and ruthenium ammine complex ions represented by $[Ru(NH_3)_4]^{2+}$ or $[Ru(NH_3)_6]^{3+}$. This is because these cations are predominantly adsorbed especially to proton-conductive passages in the cation-exchange resin, and are less apt to be adsorbed onto surface of carbon particles which are exposed without being covered with the cation-exchange resin. Other usable examples of the cations include cations containing at least one element selected from the group consisting of magnesium, aluminum, vanadium, chromium, manganese, iron, cobalt, nickel, copper, zinc, silver, and tungsten. This is because an alloy comprising one or more metals belonging to the platinum group and any of those metals is a preferred catalyst metal since not only the platinum-group metals can be contained therein in a reduced amount but also this alloy can be expected to have satisfactory CO tolerance and high activity in oxygen reduction reaction. It is therefore preferred that the processes of the invention for producing an electrode for fuel cells should have an adsorption step in which cations containing at least one element selected from the group consisting of magnesium, aluminum, vanadium, chromium, manganese, iron, cobalt, nickel, copper, zinc, silver, and tungsten are adsorbed simultaneously with cations containing a metal belonging to the platinum group. Alternatively, the processes preferably have both an adsorption step in which cations containing at least one element selected from the group consisting of magnesium, aluminum, vanadium, chromium, manganese, iron, cobalt, nickel, copper, zinc, silver, and tungsten are adsorbed and another adsorption step in which cations containing a metal belonging to the platinum group are adsorbed.

Reduction Step

Subsequently, the cations containing the catalyst metal adsorbed into the cation-exchange resin are reduced in a gaseous atmosphere comprising hydrogen gas resulting formation of the catalyst metal. In this reduction step, methods for reduction are not particularly limited. It is, however, preferred to employ a chemical method of reduction which uses a reducing agent suitable for mass production. Especially preferred is a method of gas-phase reduction with hydrogen gas or a gas containing hydrogen and a method of gas-phase reduction with an inert gas containing hydrazine. The gas containing hydrogen gas is preferably a mixed gas comprising hydrogen gas and an inert gas such as nitrogen, helium, or argon and preferably having a hydrogen gas concentration of 10% by volume or higher. In the reduction step, the carbon particles show catalytic activity in the reduction reaction of the cations of a catalyst metal element. As FIG. 1 shows, cations of a catalyst metal element 1 and 3 are predominantly adsorbed in the adsorption step to sites where the surface of a carbon particle 5 contacts proton-conductive passages 2 in the cation-exchange resin. However, since the cation-exchange resin is thought to be attached in a given thickness to the surface of the carbon particle 5, the cations 1 and 3 are thought to be adsorbed not only onto areas close to the surface of the carbon particle 5 but also areas remote from the carbon particle 5. This idea is further explained by reference to FIG. 1. There are two kinds of cations, i.e., cations 3 adsorbed on areas close to the surface of the carbon particle 5 and cations 1 adsorbed on areas remote from the carbon particle 5. The cations 1, which are not present near the surface of the carbon particle 5, are uninfluenced by the catalytic activity of the carbon particle and are hence less apt to be reduced. In contrast, the cations of a catalyst metal element 3, which are present near the surface of the carbon particle 5, are influenced by the catalytic activity of the carbon particle 5 and are hence apt to be reduced. Consequently, the cations 3, which are present near the carbon particle surface, are predominantly reduced by conducting reduction at a temperature lower than the temperatures at which the cations 1, which are not present near the surface of the carbon particle 5, are reducible. It is therefore preferred to use a suitable kind of reducing agent and suitably regulate the reduction pressure, concentration of the reducing agent, reduction time, and reduction temperature in the reduction step so as to enable the cations of a catalyst metal element which are present on the carbon particle surface to be more predominantly reduced. Specifically, the reduction is conducted at a temperature lower than the temperatures at which the cations 1, which are not present near the carbon particle surface, are reducible. The reduction step is conducted in such a manner preferably so that the amount of the resultant catalyst metal loaded on sites where the surface of the carbon particles contacts proton-conductive passages in the cation-exchange resin exceeds 80% by weight of the total amount of all the catalyst metal loaded. For example, platinum ammine complex ions $[Pt(NH_3)_4]^{2+}$ adsorbed on a perfluorocarbonsulfonic acid type cation-exchange resin film have a reduction temperature of about 300° C. in reduction with hydrogen (see Tetsuo Sakai, Osaka Kogyo Gijutsu Shikenjo Kihô, 36, 10 (1985)). However, it has been reported that $[Pt(NH_3)_4]^{2+}$ adsorbed on the surface of carbon particles modified with exchange groups (e.g., Denka Black, Vulcan XC-72, or Black Pearl 2000) has a reduction temperature of 180° C. (see K. Amine, M. Mizuhata, K. Oguro, H. Takenaka, J. Chem. Soc. Faraday Trans., 91, 4451 (1995)).Consequently, when Vulcan XC-72 and $[Pt(NH_3)_4]Cl_2$, for example, are used as carbon particles and a catalyst-yielding compound, respectively, then an electrode in which the amount of a catalyst metal loaded on sites where the surface of the carbon particles contacts proton-conductive passages in a cation-exchange resin exceeds 80% by weight of the total amount of all the catalyst metal loaded can be produced by the following method. First, a no-catalyzed electrode comprising a cation-exchange resin and the carbon particles is immersed in an aqueous solution of $[Pt(NH_3)_4]Cl_2$ to thereby adsorb $[Pt(NH_3)_4]^{2+}$ to proton-conductive passages in the cation-exchange resin by the ion-exchange reaction thereof with counter ions ($H^+$) of the cation-exchange resin. Thereafter, the no-catalyzed electrode is subjected to reduction with hydrogen gas at 180° C. As a result, an electrode for fuel cells is obtained in which the catalyst metal (platinum) is distributed in such a state that the amount of the catalyst metal loaded on sites where the surface of the carbon particles contacts proton-conductive passages in the cation-exchange resin exceeds 80% by weight of the total amount of all the catalyst metal loaded.

Thus, an appropriate combination of cations of a catalyst metal element with carbon particles is selected and the temperature for reduction with, e.g., hydrogen gas is regulated, whereby an electrode for fuel cells in which the amount of the catalyst metal loaded on sites where the surface of the carbon particles contacts proton-conductive passages in the cation-exchange resin exceeds 80% by weight of the total amount of all the catalyst metal loaded can be produced. The cations of a catalyst metal element (e.g., $[Pt(NH_3)_4]^{2+}$) unreduced in the electrode can be eluted and recovered therefrom by immersing the electrode in an acid aqueous solution after the reduction step. This operation can reduce the cost of production of electrodes for fuel cells.

The temperature for the step of reduction with a gas comprising hydrogen gas is preferably lower than the decomposition temperature of the cation-exchange resin so as to prevent the resin from deteriorating. More preferably, the reduction is conducted at a temperature lower than the glass transition temperature of the cation-exchange resin. It is therefore preferred to select a combination of carbon particles with cations of a catalyst metal element so that the temperature to be used for the reduction of the cations with hydrogen gas is lower than the decomposition temperature or glass transition temperature of the cation-exchange resin.

The cation-exchange resins generally used in electrodes for fuel cells are of the perfluorocarbonsulfonic acid type, and the decomposition temperature thereof is 280° C. Consequently, when reduction is conducted at a temperature lower than 280° C., the cation-exchange resin contained in the electrode can be inhibited from deteriorating. From the standpoint of causing the reduction reaction to proceed sufficiently, the reduction temperature is preferably 200° C. or lower, more preferably from 100° C. to 200° C. In such processes of the invention in which the reduction is conducted at a temperature as low as 200° C. or below, particle growth does not occur during the reduction and crystal growth also does not occur because of the low temperature. In the case where an alloy composed of two or more metals is to be formed as a catalyst metal, alloying proceeds even at such a low temperature. This alloying is presumed to be considerably attributable to the catalytic function of the carbon particles.

The time period of reduction with a gas comprising hydrogen gas is preferably 10 hours or longer, more preferably 200 hours or longer. This is because the cations of a catalyst metal element which have been adsorbed in the adsorption step are sufficiently reduced in such a reduction period and the metal obtained by this reduction step has greatly improved catalytic activity.

By repeatedly conducting the adsorption step and reduction step a given number of times, the metal can be fixed in an increased amount. Furthermore, in repetitions of these steps, the catalyst metal which has been fixed can be used as nuclei to grow the catalyst metal. Thus, a catalyst metal having a desired particle size can be fixed.

Ageing Step

In the second process, the no-catalyzed electrode which has undergone the reduction step is aged in a gaseous atmosphere comprising an inert gas as the main component or an acid solution or alkaline solution. The time period of this ageing step is preferably 10 hours or longer from the standpoint of enhancing the effects of the invention, and is more preferably 200 hours or longer from the standpoint of further enhancing the effects of the invention. The inert gas is not particularly limited. For example, an inert gas for general use can be employed. Examples thereof include helium gas, neon gas, argon gas, and nitrogen gas. The ageing gas is not particularly limited as long as it does not considerably influence the properties or shapes of the cation-exchange resin, carbon particles, or catalyst metal. For example, it may contain hydrogen, hydrazine, etc.

As the acid solution can be used a solution of at least one compound selected from the group consisting of sulfuric acid, hydrochloric acid, nitric acid, phosphoric acid, and perchloric acid in water or an alcohol or in a water/alcohol mixture. As the alkaline solution can be used a solution of one or more compounds of salts having a hydroxyl group, especially preferably at least one compound selected from the group consisting of sodium hydroxide and potassium hydroxide, in water or an alcohol or in a water/alcohol mixture. An alcohol with four carbon atoms or lower, for example methanol, ethanol, 1-propanol, 2-propanol, 1-butanol, 2-butanol or a mixture of one or more of these alcohols, may be used as the foregoing alcohol and the one of the foregoing water/alcohol mixture in this step.

The temperature for this ageing step is not particularly limited, but is preferably 200° C. or lower, more preferably from 10° C. to 200° C. This is because at such an ageing temperature, the cation-exchange resin contained in the electrode can be inhibited from deteriorating. The pressure for the ageing step is not particularly limited, and any pressure can be used for producing the effects of the invention. Although the ageing can be conducted at a pressure of 1 atm or lower, and even at a reduced pressure of 0.1 atm or lower, it is preferably conducted at 1 atm or lower.

Figure 2:
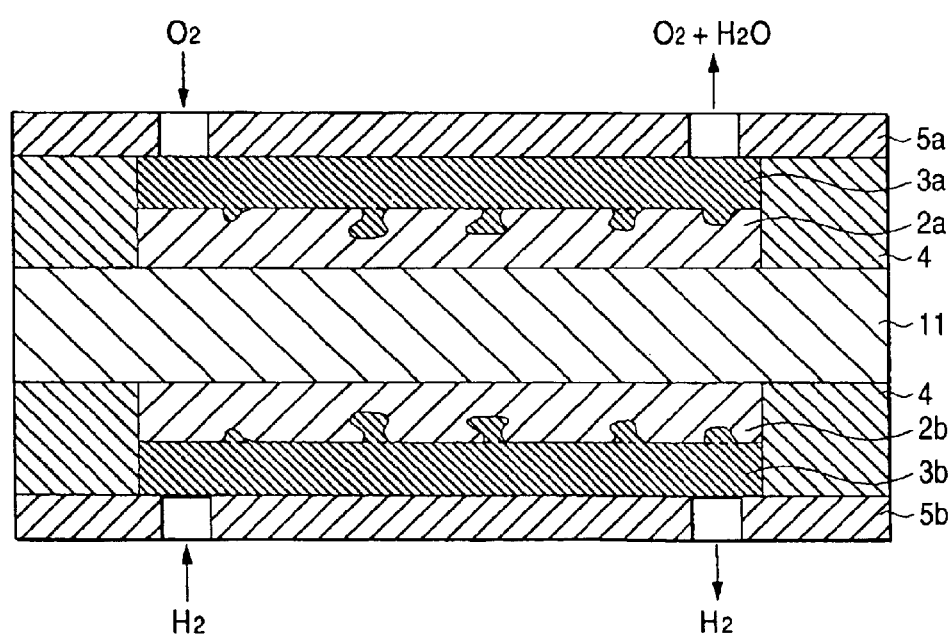
FIG. 2 is a diagrammatic sectional view of an example of a polymer electrolyte fuel cell.

An example of the constitution of a polymer electrolyte fuel cell employing the thus-produced electrode for fuel cells will be explained next. This embodiment of the fuel cell has, for example, the structure shown in FIG. 2. This cell comprises a solid polymer electrolyte film 11, a cathode 2a bonded to one side of the film 11, an anode 2b bonded to the other side, and collectors 3a and 3b respectively in contact with the cathode 2a and the anode 2b on their sides not bonded to the solid polymer electrolyte film 11. The cell further has a packing 4 disposed on the periphery thereof and a positive graphite electrode 5a and a negative graphite electrode 5b respectively pressure-welded to the collectors 3a and 3b.

The invention will be explained below by means of preferred examples thereof.

EXAMPLE 1

A mixture of 30 g of a cation-exchange resin (5 wt % Nafion solution manufactured by Aldrich Inc.) and 2.8 g of carbon particles (Vulcan XC-72) was kneaded and concentrated with heating to obtain a paste. This paste was applied to a FEP blank (Tetra fluoro ethylene hexsa fluoro propylene copolymer (FEP)) to form a film of the paste (thickness, about 13 $\mu$m) and then dried at room temperature. Thus, a no-catalyzed electrode was obtained.

In 100 mL of a 50 mmol/L aqueous solution of [Pt(NH$_3$)$_4$]Cl$_2$ was immersed 0.75 g of the no-catalyzed electrode comprising the cation-exchange resin and the carbon particles for 24 hours to thereby adsorb [Pt(NH$_3$)$_4$]$^{2+}$ to proton-conductive passages in the cation-exchange resin by an ion-exchange reaction. Thereafter, the no-catalyzed electrode was sufficiently rinsed with purified water, dried, and then reduced for 7 hours in a hydrogen atmosphere having a pressure of 1 atm and a temperature of 180° C.

Subsequently, the foregoing no-catalyzed electrode was immersed in 100 mL of a 50 mmol/L aqueous solution of [Ru(NH$_3$)$_6$]Cl$_3$ for 24 hours to thereby adsorb [Ru(NH$_3$)$_6$]$^{3+}$ to the proton-conductive passages in the cation-exchange resin by an ion-exchange reaction (adsorption step). Thereafter, the no-catalyzed electrode was sufficiently rinsed with purified water, dried, and then reduced for 24 hours in a hydrogen atmosphere having a pressure of 5 atm and a temperature of 200° C. (reduction step). Thus, an alloy of platinum and ruthenium was fixed predominantly to sites where the surface of the carbon particles contacted the proton-conductive passages in the cation-exchange resin.

Furthermore, the foregoing no-catalyzed electrode was immersed in 0.5 mol/L sulfuric acid for 5 hours to elute the unnecessary [Pt(NH$_3$)$_4$]$^{2+}$ and [Ru(NH$_3$)$_6$]$^{3+}$ unreduced in the reduction steps. Thus, electrode A according to the invention was obtained. An analysis separately conducted revealed that the amounts of platinum and ruthenium supported on electrode A were 0.015 mg/cm$^2$ and 0.008 mg/cm$^2$, respectively. It was further ascertained through a TEM examination that this catalyst metal had a mean particle diameter of 1.0 nm.

Figure 3A:
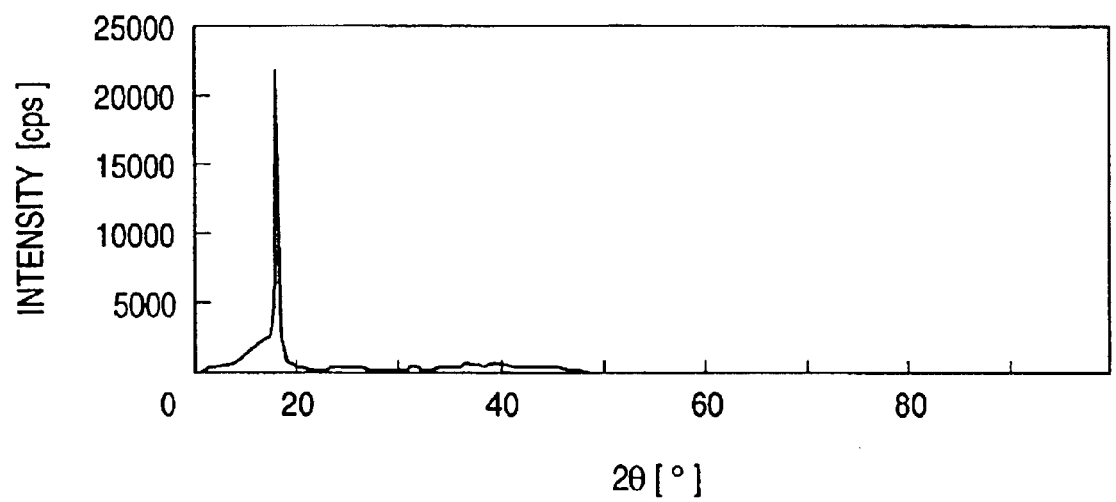
FIG. 3 is a presentation showing a comparison in X-ray diffraction pattern between electrode A according to the invention (3A) and an electrode obtained by applying a carbon supporting an alloy of platinum and ruthenium (3B).
Figure 3B:
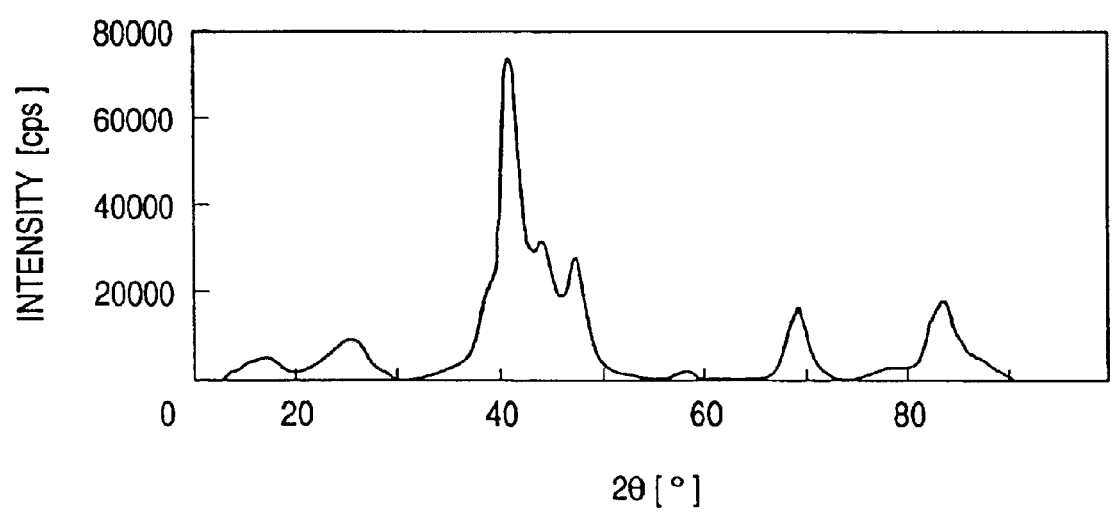

An X-ray diffraction pattern for electrode A is shown in FIG. 3A. For the purpose of comparison, an X-ray diffraction pattern for an electrode obtained by applying a carbon supporting an alloy of platinum and ruthenium (manufactured by Tanaka Kikinzoku K.K.; Vulcan XC-72 having 18.6 wt % platinum and 14.4 wt % ruthenium supported thereon) and a cation-exchange resin (5 wt % Nafion solution manufactured by Aldrich Inc.) to a carbon paper is shown in FIG. 3B. In the comparative electrode, the amounts of platinum and ruthenium supported thereon had been regulated to 0.015 mg/cm$^2$ and 0.008 mg/cm$^2$, respectively. FIG. 3B shows that in the electrode produced with the carbon supporting an alloy of platinum and ruthenium, the value of 2θ had peaks in the range of from 35° to 50° and at around 68° and 83°. This indicates that the alloy of platinum and ruthenium in this electrode was crystalline (see S. C. Thomas, X. Ren, and S. Gottesfeld, Journal of The Electrochemical Society, 146, 4354 (1999)). In contrast, in electrode A according to the invention, no peak was observed which indicated the presence of crystals of platinum, ruthenium or an alloy of these metals. It was hence found that the metal supported on the electrode A of the invention was amorphous.

EXAMPLE 2

A mixture of 30 g of a cation-exchange resin (5 wt % Nafion solution manufactured by Aldrich Inc.) and 2.8 g of carbon particles (Vulcan XC-72) was kneaded and concentrated with heating to obtain a paste. This paste was applied to a FEP blank (Tetra fluoro ethylene hexsa fluoro propylene copolymer (FEP)) to form a film of the paste (thickness, about 13 μm) and then dried at room temperature. Thus, a no-catalyzed electrode was obtained.

In 100 mL of a 50 mmol/L aqueous solution of [Pt(NH$_3$)$_4$]Cl$_2$ was immersed 0.75 g of the no-catalyzed electrode comprising the cation-exchange resin and the carbon particles for 24 hours to thereby adsorb [Pt(NH$_3$)$_4$]$^{2+}$ to proton-conductive passages in the cation-exchange resin by an ion-exchange reaction (adsorption step). Thereafter, the no-catalyzed electrode was sufficiently rinsed with purified water, dried, and then reduced for 7 hours in a hydrogen atmosphere having a pressure of 1 atm and a temperature of 180° C. (reduction step).

Subsequently, the foregoing no-catalyzed electrode was immersed in 100 mL of a 50 mmol/L aqueous solution of [Ru(NH$_3$)$_6$]Cl$_3$ for 24 hours to thereby adsorb [Ru(NH$_3$)$_6$]$^{3+}$ to the proton-conductive passages in the cation-exchange resin by an ion-exchange reaction (adsorption step). Thereafter, the no-catalyzed electrode was sufficiently rinsed with purified water, dried, and then reduced for 7 hours in a hydrogen atmosphere having a pressure of 5 atm and a temperature of 200° C. (reduction step). Thus, an alloy of platinum and ruthenium was fixed predominantly to sites where the surface of the carbon particles contacted the proton-conductive passages in the cation-exchange resin.

Furthermore, the foregoing no-catalyzed electrode was immersed in 0.5 mol/L sulfuric acid for 1 hour to elute the unnecessary [Pt(NH$_3$)$_4$]$^{2+}$ and [Ru(NH$_3$)$_6$]$^{3+}$ unreduced in the reduction steps. Thereafter, the no-catalyzed electrode was aged at 100° C. for 10 hours in an argon atmosphere containing 0.1% air. Thus, electrode B according to the invention was obtained. An analysis separately conducted revealed that the amounts of platinum and ruthenium supported on electrode B were 0.014 mg/cm$^2$ and 0.008 mg/cm$^2$, respectively. It was further ascertained through a TEM examination that this catalyst metal had a mean particle diameter of 1.0 nm.

EXAMPLE 3

A mixture of 30 g of a cation-exchange resin (5 wt % Nafion solution manufactured by Aldrich Inc.) and 2.8 g of carbon particles (Vulcan XC-72) was kneaded and concentrated with heating to obtain a paste. This paste was applied to a FEP blank (Tetra fluoro ethylene hexsa fluoro propylene copolymer (FEP)) to form a film of the paste (thickness, about 13 μm) and then dried at room temperature. Thus, a no-catalyzed electrode was obtained.

In 100 mL of an aqueous solution containing 38.3 mmol/L [Pt(NH$_3$)$_4$]Cl$_2$ and 12.8 mmol/L [Ru(NH$_3$)$_6$]Cl$_3$ was immersed 0.75 g of the no-catalyzed electrode comprising the cation-exchange resin and the carbon particles for 24 hours to thereby adsorb [Pt(NH$_3$)$_4$]$^{2+}$ and [Ru(NH$_3$)$_6$]$^{3+}$ to proton-conductive passages in the cation-exchange resin by ion-exchange reactions (adsorption step). Thereafter, the no-catalyzed electrode was sufficiently rinsed with purified water, dried, and then reduced for 7 hours in a hydrogen atmosphere having a pressure of 1 atm and a temperature of 200° C. (reduction step). Thus, an alloy of platinum and ruthenium was fixed predominantly to sites where the surface of the carbon particles contacted the proton-conductive passages in the cation-exchange resin. Thereafter, an adsorption step for adsorbing [Pt(NH$_3$)$_4$]$^{2+}$ and [Ru(NH$_3$)$_6$]$^{3+}$ and a subsequent reduction step were carried out once again in the same manner.

Furthermore, the foregoing no-catalyzed electrode was immersed in 0.5 mol/L sulfuric acid for 1 hour to elute the unnecessary [Pt(NH$_3$)$_4$]$^{2+}$ and [Ru(NH$_3$)$_6$]$^{3+}$ unreduced in the reduction steps. Thereafter, the no-catalyzed electrode was aged at 100° C. for 10 hours in an argon atmosphere containing 0.1% air. Thus, electrode C according to the invention was obtained. An analysis separately conducted revealed that the amounts of platinum and ruthenium supported on electrode C were 0.015 mg/cm and 0.008 mg/cm$^2$, respectively. It was further ascertained through a TEM examination that this catalyst metal had a mean particle diameter of 1.0 nm.

EXAMPLE 4

A mixture of 30 g of a cation-exchange resin (5 wt % Nafion solution manufactured by Aldrich Inc.) and 2.8 g of carbon particles (Vulcan XC-72) was kneaded and concentrated with heating to obtain a paste. This paste was applied to a FEP blank (Tetra fluoro ethylene hexsa fluoro propylene copolymer (FEP)) to form a film of the paste (thickness, about 13 μm) and then dried at room temperature. Thus, a no-catalyzed electrode was obtained.

In 100 mL of a 50 mmol/L aqueous solution of Ni(NO$_3$)$_2$ was immersed 0.75 g of the no-catalyzed electrode comprising the cation-exchange resin and the carbon particles for 24 hours to thereby adsorb Ni$^{2+}$ to proton-conductive passages in the cation-exchange resin by an ion-exchange reaction. Thereafter, the no-catalyzed electrode was sufficiently rinsed with purified water, dried, and then reduced for 6 hours in a hydrogen atmosphere having a pressure of 30 atm and a temperature of 180° C.

Subsequently, the foregoing no-catalyzed electrode was immersed in 100 mL of a 50 mmol/L aqueous solution of [Pt(NH$_3$)$_4$]Cl$_2$ for 24 hours to thereby adsorb [Pt(NH$_3$)$_4$]$^{2+}$ to the proton-conductive passages in the cation-exchange resin by an ion-exchange reaction (adsorption step). Thereafter, the no-catalyzed electrode was sufficiently rinsed with purified water, dried, and then reduced for 5 hours in a hydrogen atmosphere having a pressure of 1 atm and a temperature of 200° C. (reduction step). Thus, platinum and nickel were fixed predominantly to sites where the surface of the carbon particles contacted the proton-conductive passages in the cation-exchange resin.

The foregoing no-catalyzed electrode thus treated was immersed again in a 50 mmol/L aqueous solution of [Pt(NH$_3$)$_4$]Cl$_2$ for 24 hours to thereby adsorb [Pt(NH$_3$)$_4$]$^{2+}$ to the proton-conductive passages in the cation-exchange resin by an ion-exchange reaction (adsorption step). Thereafter, the no-catalyzed electrode was sufficiently rinsed with purified water, dried, and then reduced for 12 hours in a hydrogen atmosphere having a pressure of 1 atm and a temperature of 200° C. (reduction step). Thus, an alloy of platinum and nickel was fixed predominantly to sites where the surface of the carbon particles contacted the proton-conductive passages in the cation-exchange resin.

Furthermore, the foregoing no-catalyzed electrode was immersed in 0.5 mol/L sulfuric acid for a whole day and night to elute the unnecessary Ni$^{2+}$ and [Pt(NH$_3$)$_4$]$^{2+}$ unreduced in the reduction steps. Thus, electrode D according to the invention was obtained. An analysis separately conducted revealed that the amount of platinum supported on electrode D was 0.04 mg/cm$^2$. It was further ascertained through a TEM examination that this catalyst metal had a mean particle diameter of 1.2 nm.

EXAMPLE 5

Electrode B produced in Example 2 was aged at 100° C. for 24 hours in 0.1 N aqueous sulfuric acid solution to obtain electrode E1. Furthermore, electrode B produced in Example 2 was aged at 100° C. for 24 hours in 0.1 N aqueous sodium hydroxide solution to obtain electrode E2.

EXAMPLE 6

A mixture of 30 g of a cation-exchange resin (5 wt % Nafion solution manufactured by Aldrich Inc.) and 2.8 g of carbon particles (Vulcan XC-72) was kneaded and concentrated with heating to obtain a paste. This paste was applied to a FEP blank (Tetra fluoro ethylene hexsa fluoro propylene copolymer (FEP)) to form a film of the paste (thickness, about 13 μm) and then dried at room temperature. Thus, a no-catalyzed electrode was obtained. In 100 mL of a 50 mmol/L aqueous solution of [Pt(NH$_3$)$_4$]Cl$_2$ was immersed 0.75 g of the no-catalyzed electrode comprising the cation-exchange resin and the carbon particles for 24 hours to thereby adsorb [Pt(NH$_3$)$_4$]$^{2+}$ to proton-conductive passages in the cation-exchange resin by an ion-exchange reaction. Thereafter, the no-catalyzed electrode was sufficiently rinsed with purified water, dried, and then reduced for 24 hours in a hydrogen atmosphere having a pressure of 1 atm and a temperature of 180° C. Thus, platinum was fixed predominantly to sites where the surface of the carbon particles contacted the proton-conductive passages in the cation-exchange resin. Furthermore, the no-catalyzed electrode was immersed in 0.5 mol/L sulfuric acid for 5 hours to elute the unnecessary [Pt(NH$_3$)$_4$]$^{2+}$ unreduced in the reduction steps. Thus, electrode F according to the invention was obtained. An analysis separately conducted revealed that the amount of platinum supported on electrode F was 0.015 mg/cm$^2$. It was further ascertained through a TEM examination that this catalyst metal had a mean particle diameter of 1.0 nm.

COMPARATIVE EXAMPLE 1

A mixture of 4.2 g of a carbon supporting an alloy of platinum and ruthenium (manufactured by Tanaka Kikinzoku K.K.; Vulcan XC-72 having 18.6 wt % platinum and 14.4 wt % ruthenium supported thereon) and 30 g of a cation-exchange resin (5 wt % Nafion solution manufactured by Aldrich Inc.) was kneaded and concentrated with heating to obtain a paste. This paste was applied to a FEP blank (Tetra fluoro ethylene hexsa fluoro propylene copolymer (FEP)) to form a film of the paste (thickness, about 13 μm) and then dried at room temperature. Thus, electrode G as a comparative electrode was obtained. The amount of platinum contained in electrode G had been regulated to about 0.05 mg/cm$^2$ by regulating the amount of the carbon supporting an alloy of platinum and ruthenium in paste preparation.

COMPARATIVE EXAMPLE 2

A mixture of 4.0 g of a carbon supporting platinum (manufactured by Tanaka Kikinzoku K. K.; Vulcan XC-72 having 30 wt % platinum supported thereon) and 30 g of a cation-exchange resin (5 wt % Nafion solution manufactured by Aldrich Inc.) was kneaded and concentrated with heating to obtain a paste. This paste was applied to a FEP blank (Tetra fluoro ethylene hexsa fluoro propylene copolymer (FEP)) to form a film of the paste (thickness, about 13 μm) and then dried at room temperature. Thus, electrode H as a comparative electrode was obtained. The amount of platinum contained in electrode H had been regulated to about 0.05 mg/cm$^2$ by regulating the amount of the carbon supporting platinum in paste preparation.

COMPARATIVE EXAMPLE 3

A mixture of 30 g of a cation-exchange resin (5 wt % Nafion solution manufactured by Aldrich Inc.) and 2.8 g of carbon particles (Vulcan XC-72) was kneaded and concentrated with heating to obtain a paste. This paste was applied to a FEP blank (Tetra fluoro ethylene hexsa fluoro propylene copolymer (FEP)) to form a film of the paste (thickness, about 13 μm) and then dried at room temperature. Thus, a no-catalyzed electrode was obtained.

In 100 mL of a 50 mmol/L aqueous solution of [Pt(NH$_3$)$_4$]Cl$_2$ was immersed the no-catalyzed electrode comprising the cation-exchange resin and the carbon particles for 24 hours to thereby adsorb [Pt(NH$_3$)$_4$]$^{2+}$ to proton-conductive passages in the cation-exchange resin by an ion-exchange reaction. Thereafter, the no-catalyzed electrode was sufficiently rinsed with purified water, dried, and then reduced for 7 hours in a hydrogen atmosphere having a pressure of 1 atm and a temperature of 180° C.

Subsequently, the foregoing no-catalyzed electrode was immersed in a 50 mmol/L aqueous solution of [Ru(NH$_3$)$_6$]Cl$_3$ for 24 hours to thereby adsorb [Ru(NH$_3$)$_6$]$^{3+}$ to the proton-conductive passages in the cation-exchange resin by an ion-exchange reaction (adsorption step). Thereafter, the no-catalyzed electrode was sufficiently rinsed with purified water, dried, and then reduced for 7 hours in a hydrogen atmosphere having a pressure of 5 atm and a temperature of 200° C. (reduction step). Thus, an alloy of platinum and ruthenium was fixed predominantly to sites where the surface of the carbon particles contacted the proton-conductive passages in the cation-exchange resin.

Furthermore, the foregoing no-catalyzed electrode was immersed in 0.5 mol/L sulfuric acid for 1 hour to elute the unnecessary [Pt(NH$_3$)$_4$]$^{2+}$ and [Ru(NH$_3$)$_6$]$^{3+}$ unreduced in the reduction steps. Thus, electrode I as a comparative electrode was obtained. An analysis separately conducted revealed that the amounts of platinum and ruthenium supported on electrode I were 0.014 mg/cm$^2$ and 0.008 mg/cm$^2$, respectively. It was further ascertained through a TEM examination that this catalyst metal had a mean particle diameter of 1.0 nm.

Electrodes A, B, C, E1, E2, F, G, H, and I obtained in Examples and the Comparative Examples each were bonded as an anode to each side of an ion-exchange membrane (Nafion, manufactured by Du Pont Inc.; film thickness, about 50 μm) by hot pressing (140° C.), and electrode H was likewise bonded as a cathode to the other side thereof. Thereafter, a carbon paper as an electrochemically conductive porous material with water repellency was bonded to the outer side of each electrode by hot pressing. Each resultant assembly was incorporated into a single-cell holder. Thus, cell A, cell B, cell C, cell E1, cell E2, cell F, cell G, cell H, and cell I were obtained respectively from those electrodes.

On the other hand, electrode D according to the invention and electrode H were bonded as a cathode and an anode respectively to both sides of an ion-exchange membrane (Nafion, manufactured by Du Pont Inc.; film thickness, about 50 μm) by hot pressing (140° C.). Thereafter, a carbon paper as a electrochemically conductive porous material with water repellency was bonded to the outer side of each electrode by hot pressing. The resultant assembly was incorporated into a single-cell holder to obtain cell D.

Cell A and cell H were evaluated for electrochemical properties by the cyclic voltammetry. In each cell, electrode A or electrode H was used as a working electrode and the other electrode as a reference electrode. Humidified argon gas containing 100 ppm CO and hydrogen gas were introduced at 26° C. into the working electrode side and the reference electrode side, respectively, at a rate of 30 cc/min each. These cells were kept at 300 mV/RHE for 30 minutes. Thereafter, the gas being introduced into the working electrode side was replaced with argon gas, and the cells were kept in that state for further 30 minutes.

Subsequently, the potentials of the working electrodes were swept at 100 mV/sec in the ranges of from 50 mV/RHE to 800 mV/RHE and from 50 mV/RHE to 1,000 mV/RHE, respectively. This measurement was conducted at a constant temperature of 26° C. The potential of the reference electrode based on the potential of a reference electrode in an open circuit was taken as the RHE potential. The results of this evaluation are shown in FIG. 4.

Figure 4:
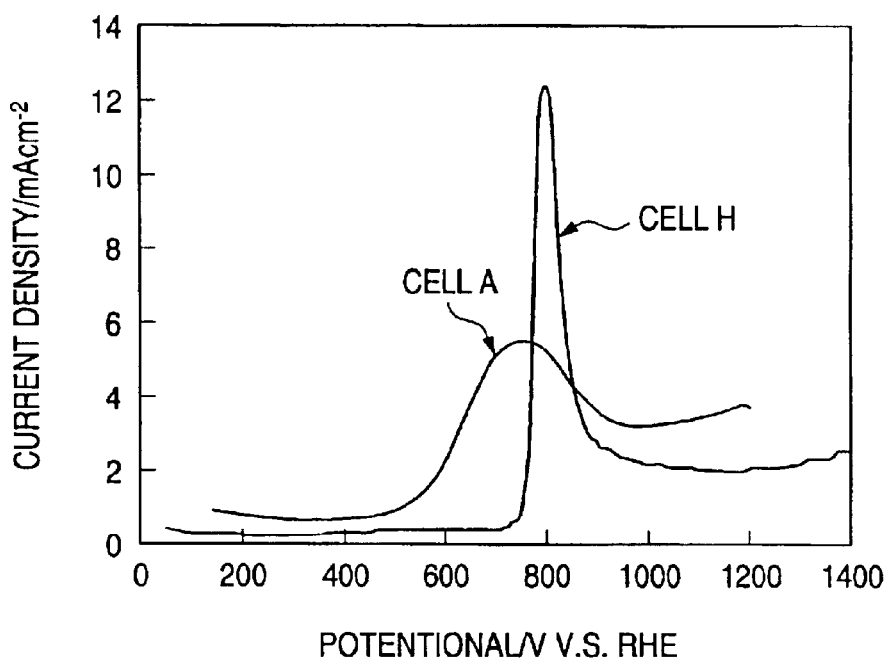
FIG. 4 is a presentation showing cyclic voltammogram of cell A and cell H.

As apparent from FIG. 4, each cell showed a peak attributable to CO oxidation. The potential at which the CO oxidation initiated in cell A was lower than that in cell H, and the peak for cell A was broader than that for cell H. These results support that the catalyst metal supported on electrode A was amorphous.

Each cell was further examined for change in current density with time. In this examination, oxygen and hydrogen containing 20 ppm CO (2 atm, 80° C.) were used as feed gases to operate each cell at a cell voltage of 0.5 V.

Figure 5:
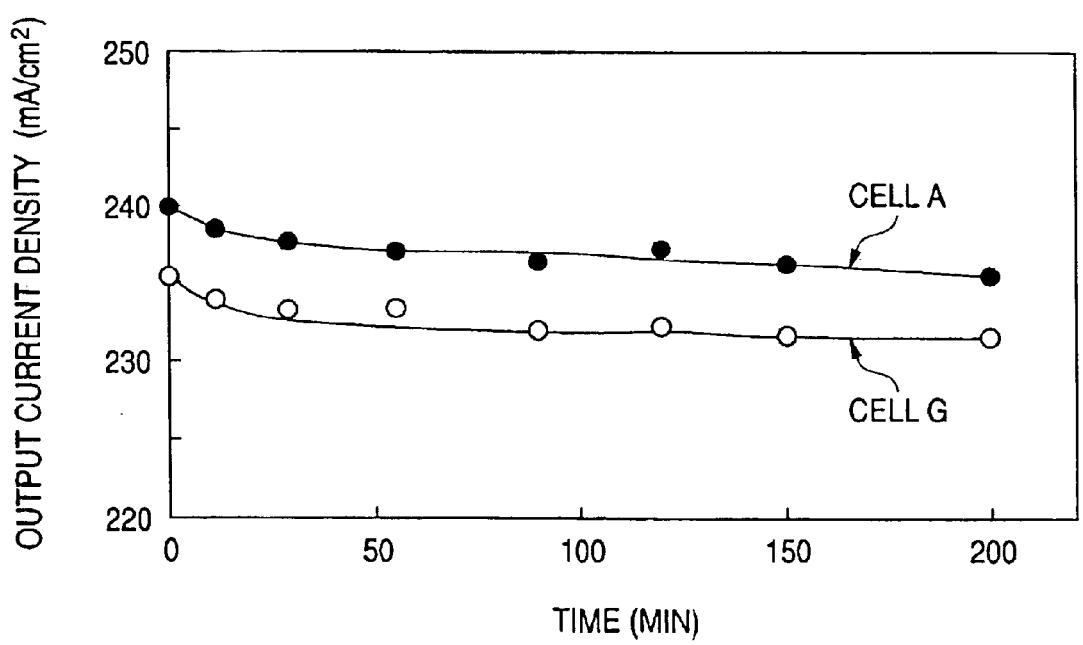
FIG. 5 is a presentation showing changes with time of the output current density of cell A and that of cell G.

The results for cells A and G are shown in FIG. 5. The output current of cell A, employing electrode A according to the invention as the anode, was equal to that of cell G, employing a conventional electrode (electrode G) as the anode. It was thus found that electrode A according to the invention had high CO tolerance despite the fact that the amount of platinum supported thereon was one-third the amount thereof in the conventional electrode G.

Furthermore, electrodes were produced in the same manner as in Example 1, except that the time period of the reduction in a hydrogen atmosphere having a pressure of 5 atm and a temperature of 200° C. was changed to each of 0, 1, 3, 5, 10, 30, 50, 100, and 250 hours. These electrodes each were incorporated into a single-cell holder like electrode A. The cells thus obtained were operated at a cell voltage of 0.5 V using hydrogen containing 20 ppm CO (2 atm, 80° C.).

Figure 6:
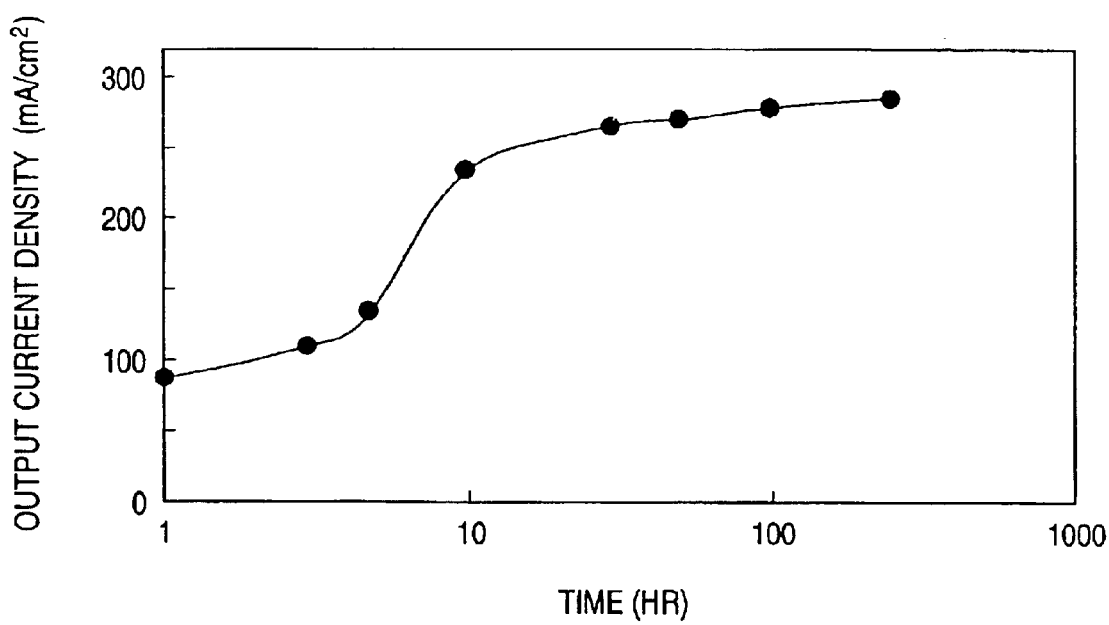
FIG. 6 is a presentation showing the relationship between reduction time and output current density.

These cells were evaluated for output current to examine the influence of the time period of reduction on output current density. The results obtained are shown in FIG. 6. It was found that reduction time periods of 10 hours and longer brought about high CO tolerance.

Figure 7:
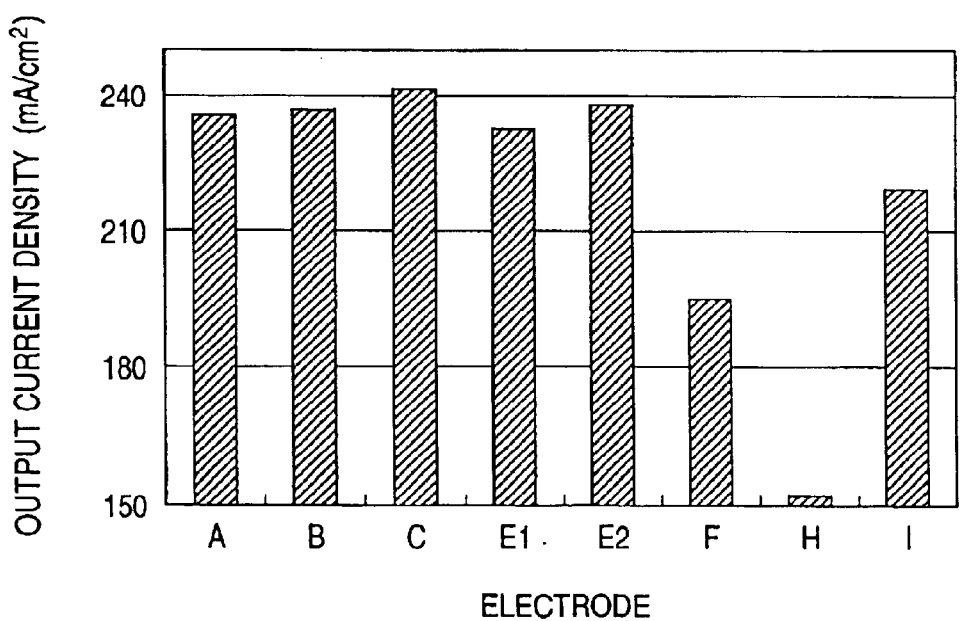
FIG. 7 is a presentation showing the output current densities of cells A, B, C, E1, E2, F, and I.

Cells A, B, C, E1, E2, F, H, and I were operated at a cell voltage of 0.5 V while feeding thereto oxygen and hydrogen containing 20 ppm CO. The operation temperatures were 80° C. for cells A to E2 and I and 90° C. for cells F and H. In FIG. 7 is shown the value of output current for each cell as measured at 120 minutes after initiation of the operation. Cells A to E2 had a higher output than cell I, and cell F had a higher output than cell H.

Figure 8:
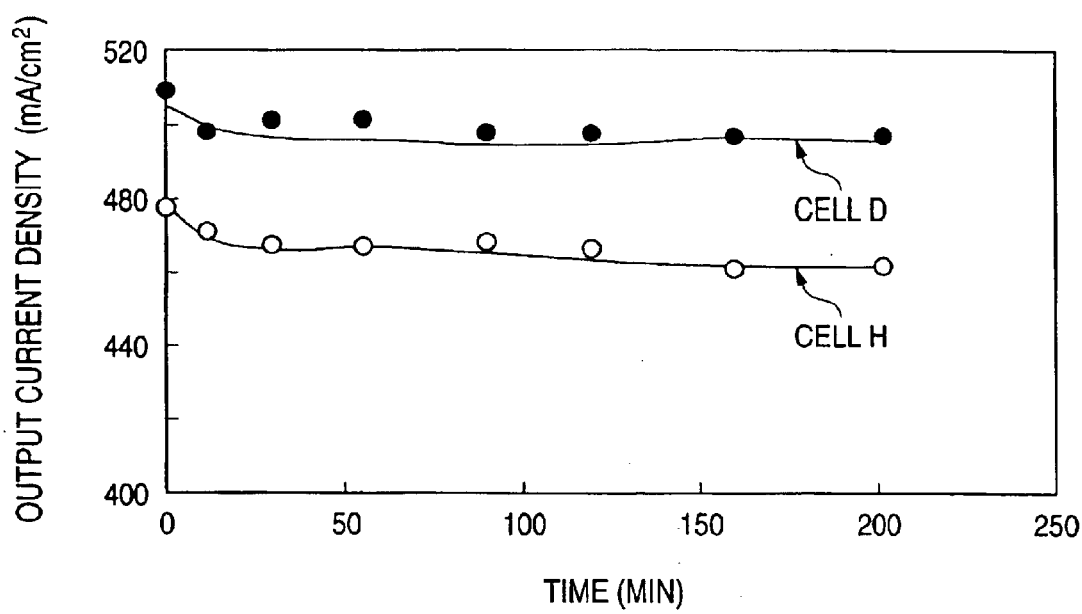
FIG. 8 is a presentation showing changes with time of the output current density of cell D and that of cell H.

Furthermore, cells D and H were operated at a cell voltage of 0.5 V using oxygen and hydrogen (2 atm, 80° C.) as feed gases, and the change thereof in current density with time was examined. The results obtained are shown in FIG. 8. Cell D, employing electrode D according to the invention as the cathode, had a higher output voltage than cell H, employing the conventional electrode H as the cathode. It was found that electrode D according to the invention had high activity in oxygen reduction reaction despite the fact that the amount of platinum supported thereon was the same as in the conventional electrode.

Those effects of the electrodes for fuel cells of the invention, which have catalyst metal particles supported mainly on sites where the surface of the carbon particles contacts proton-conductive passages in the cation-exchange resin, are due to the improved catalytic activity per unit weight of the catalyst metal. This improved catalytic activity was achieved by the amorphous state of the catalyst metal or by the mean particle diameter thereof which is 1.5 nm or lower.

Figure 9:
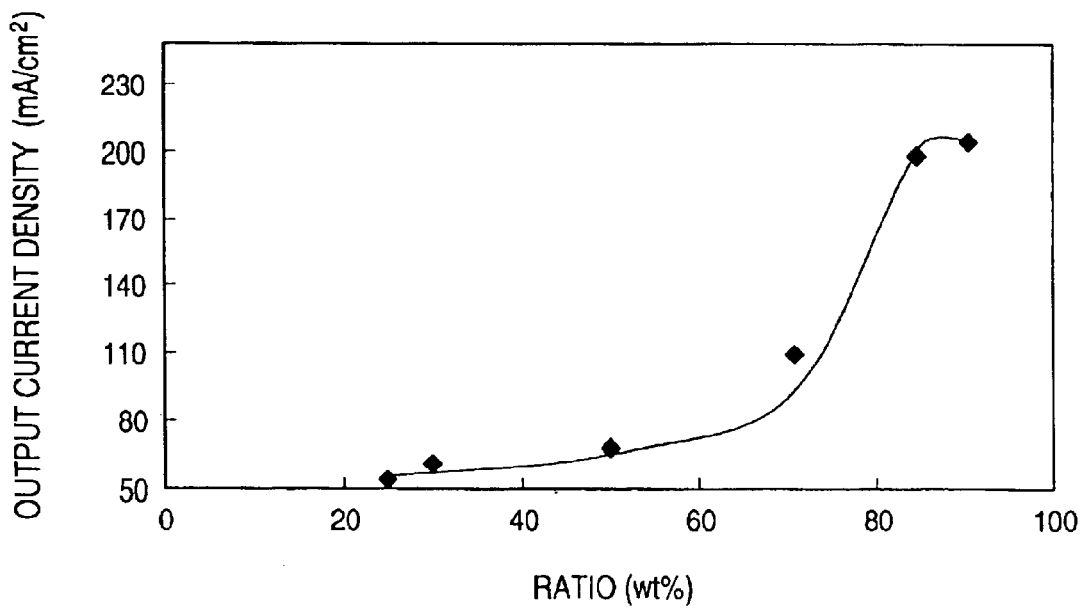
FIG. 9 is a presentation showing the relationship between output current density and the proportion of the amount of a catalyst metal predominantly loaded on sites where the surface of carbon particles contacts proton-conductive passages in a cation-exchange resin to the total amount of all the catalyst metal loaded.
Figure 10:
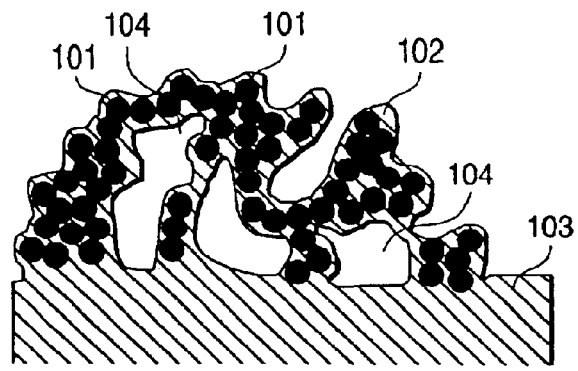
FIG. 10 is a view showing an example of the structure of an electrode for fuel cells.
Figure 11:
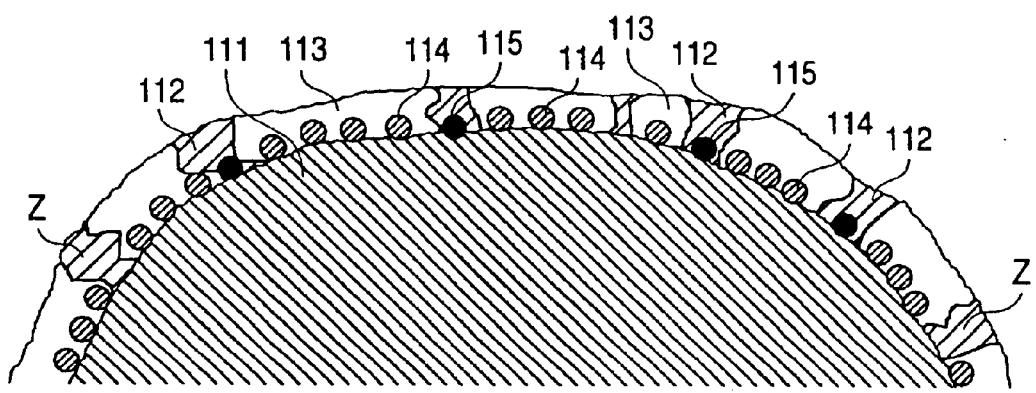
FIG. 11 is a diagrammatic view showing the state of a surface layer of a carbon particle of an electrode.
Figure 12:
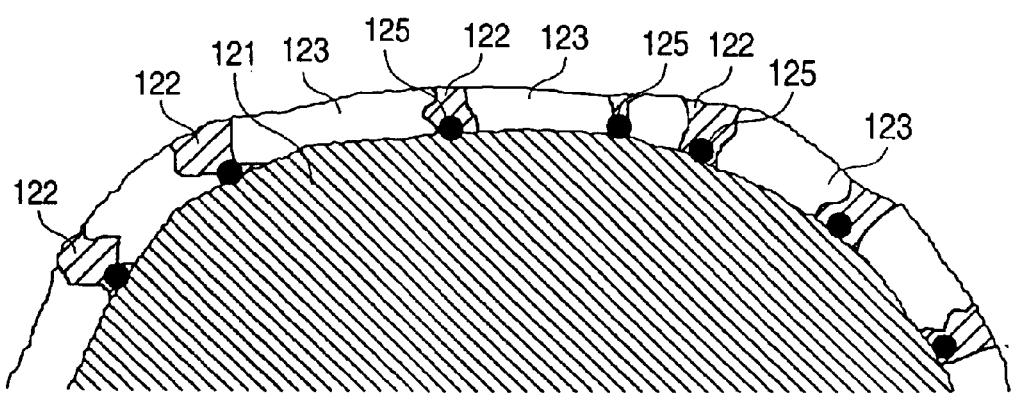
FIG. 12 is a diagrammatic view showing the state of a surface layer of a carbon particle of another electrode.

Furthermore, electrodes in which the amount of the catalyst metal loaded on sites where the surface of carbon particles contacted proton-conductive passages in a cation-exchange resin was 25, 30, 50, 70, 80, or 90% by weight of the total amount of all the catalyst metal loaded were produced in the same manner for electrode production as in Example 1, except that the pressure, reduction temperature, and reduction time in the reduction steps were regulated. These electrodes each were introduced into a single-cell holder like electrode A. The cells thus obtained were operated at a cell voltage of 0.5 V using hydrogen containing 50 ppm CO (2 atm, 90° C.) to measure the output current thereof. In FIG. 9 is shown the relationship between output current density and the proportion of the amount of the catalyst metal predominantly loaded on sites where the surface of the carbon particles contacted proton-conductive passages in the cation-exchange resin to the total amount of all the catalyst metal loaded. It was found that the electrodes according to the invention produced by the method shown in Example 1 had especially high performance when the proportion of the amount of the catalyst metal predominantly loaded on sites where the surface of the carbon particles contacted proton-conductive passages in the cation-exchange resin to the total amount of all the catalyst metal loaded was 80% by weight or higher.

According to the invention, an electrode for fuel cells which has high activity, a high catalyst utilization, and high CO tolerance and is highly active in the electrochemical oxidation reaction of methanol can be obtained. Consequently, a fuel cell with the electrode of the invention has a high output current and a long life, and can be produced at low cost.

Furthermore, according to the processes of the invention for producing an electrode for fuel cells, since a catalyst metal is fixed to three-phase boundaries formed on a surface layer of carbon particles, all the catalyst metal can effectively function at the three-phase boundaries. Consequently, not only an improved catalyst metal utilization but also enhanced electrode activity can be attained. It has hence become possible to produce a highly efficient electrode for fuel cells with a small amount of a catalyst metal.

While the invention has been described in detail and with reference to specific embodiments thereof, it will be apparent to one skilled in the art that various changes and modifications can be made therein without departing from the spirit and scope thereof.

This application is based on Japanese patent application No. 2000-220977 filed on Jul. 21, 2000, the entire contents thereof being hereby incorporated by reference.

What is claimed is:

1. An electrode for fuel cells, which comprises the following elements:
    a cation-exchange resin,
    carbon particles, and
    a catalyst metal,
the catalyst metal being amorphous, wherein the amount of the catalyst metal loaded on sites where the surface of the carbon particles contacts clusters containing hydrophilic exchange groups in the cation-exchange resin is higher than 80% by weight of the total amount of all the catalyst metal loaded.

2. The electrode of claim 1, wherein the catalyst metal has a mean particle diameter of 1.5 nm or lower.

3. The electrode of claim 2, wherein the catalyst metal comprises a metal element belonging to the platinum group.

4. The electrode of claim 3, wherein the amount of the platinum-group metal element in contained the electrode is 0.05 mg or lower per $cm^2$ of the electrode.

5. The electrode of claim 2, wherein the catalyst metal comprises platinum element and ruthenium element.

6. The electrode of claim 2, wherein the catalyst metal comprises at least one element selected from the group consisting of magnesium, aluminum, vanadium, chromium, manganese, iron, cobalt, nickel, copper, zinc, silver, and tungsten.

7. The electrode of claim 2, wherein the amount of the catalyst metal contained in the electrode is 0.1 mg or lower per $cm^2$ of the electrode.

8. The electrode of claim 1, wherein the catalyst metal comprises a metal element belonging to the platinum group.

9. The electrode of claim 8, wherein the amount of the platinum-group metal element contained in the electrode is 0.05 mg or lower per $cm^2$ of the electrode.

10. The electrode of claim 1, wherein the catalyst metal comprises platinum element and ruthenium element.

11. The electrode of claim 1, wherein the catalyst metal comprises at least one element selected from the group consisting of magnesium, aluminum, vanadium, chromium, manganese, iron, cobalt, nickel, copper, zinc, silver, and tungsten.

12. The electrode of claim 1, wherein the amount of the catalyst metal contained in the electrode is 0.1 mg or lower per $cm^2$ of the electrode.

13. An electrode for fuel cells, which comprises the following elements:
    a cation-exchange resin,
    carbon particles, and
    a catalyst metal,
    the catalyst metal having a mean particle diameter of 1.5 nm or lower, wherein the amount of the catalyst metal loaded on sites where the surface of the carbon particles contacts clusters containing hydrophilic exchange groups in the cation-exchange resin is higher than 80% by weight of the total amount of all the catalyst metal loaded.

14. The electrode of claim 13, wherein the catalyst metal comprises a metal element belonging to the platinum group.

15. The electrode of claim 14, wherein the amount of the platinum-group metal element contained in the electrode is 0.05 mg or lower per $cm^2$ of the electrode.

16. The electrode of claim 13, wherein the catalyst metal comprises platinum element and ruthenium element.

17. The electrode of claim 13, wherein the catalyst metal comprises at least one element selected from the group consisting of magnesium, aluminum, vanadium, chromium, manganese, iron, cobalt, nickel, copper, zinc, silver, and tungsten.

18. The electrode of claim 13, wherein the amount of the catalyst metal contained in the electrode is 0.1 mg or lower per $cm^2$ of the electrode.

19. The electrode of claim 13, wherein the catalyst metal has a mean particle diameter of 1.2 nm or lower.

20. The electrode of claim 19, wherein the catalyst metal comprises a metal element belonging to the platinum group.

21. The electrode of claim 20, wherein the amount of the platinum-group metal element contained in the electrode is 0.05 mg or lower per $cm^2$ of the electrode.

22. The electrode of claim 19, wherein the catalyst metal comprises platinum element and ruthenium element.

23. The electrode of claim 19, wherein the catalyst metal comprises at least one element selected from the group consisting of magnesium, aluminum, vanadium, chromium, manganese, iron, cobalt, nickel, copper, zinc, silver, and tungsten.

24. The electrode of claim 19, wherein the amount of the catalyst metal contained in the electrode is 0.1 mg or lower per $cm^2$ of the electrode.

25. The electrode of claim 13, wherein the catalyst metal has a mean particle diameter of 1.0 nm or lower.

26. The electrode of claim 25, wherein the catalyst metal comprises a metal element belonging to the platinum group.

27. The electrode of claim 26, wherein the amount of the platinum-group metal element contained in the electrode is 0.05 mg or lower per $cm^2$ of the electrode.

28. The electrode of claim 25, wherein the catalyst metal comprises platinum element and ruthenium element.

29. The electrode of claim 25, wherein the catalyst metal comprises at least one element selected from the group consisting of magnesium, aluminum, vanadium, chromium, manganese, iron, cobalt, nickel, copper, zinc, silver, and tungsten.

30. The electrode of claim 25, wherein the amount of the catalyst metal contained in the electrode is 0.1 mg or lower per $cm^2$ of the electrode.

31. The electrode of claim 13, wherein the catalyst metal has a mean particle diameter of 0.5 to 1.5 nm.

32. The electrode of claim 31, wherein the catalyst metal comprises a metal element belonging to the platinum group.

33. The electrode of claim 32, wherein the amount of the platinum-group metal element contained in the electrode is 0.05 mg or lower per $cm^2$ of the electrode.

34. The electrode of claim 31, wherein the catalyst metal comprises platinum element and ruthenium element.

35. The electrode of claim 31, wherein the catalyst metal comprises at least one element selected from the group consisting of magnesium, aluminum, vanadium, chromium, manganese, iron, cobalt, nickel, copper, zinc, silver, and tungsten.

36. The electrode of claim 31, wherein the amount of the catalyst metal contained in the electrode is 0.1 mg or lower per cm$^2$ of the electrode.

37. A process for producing an electrode for fuel cells according to claim 1 which comprises the following steps:
   (1) a formation step in which a no-catalyzed electrode comprising a mixture of a cation-exchange resin and carbon particles is formed;
   (2) an adsorption step in which the no-catalyzed electrode is immersed in a solution comprising cations containing a catalyst metal element, thereby the cations are absorbed into the cation-exchange resin based on the ion-exchange reaction of the cations with counter ions of the cation-exchange resin; and
   (3) a reduction step in which the cations adsorbed into the cation-exchange resin are reduced for 10 hours or longer in a gaseous atmosphere comprising hydrogen gas resulting in formation of the catalyst metal.

38. The process of claim 37, wherein the reduction step is conducted at a temperature of 200° C. or lower.

39. The process of claim 37, wherein the cation-exchange resin has an ion-exchange capacity of 2.5 meq/g or lower.

40. The process of claim 37, which further comprises a step in which the cations unreduced are eluted with an inorganic acid after the reduction step.

41. A process for producing an electrode for fuel cells according to claim 1 which comprises the following steps:
   (1) a formation step in which a no-catalyzed electrode comprising a mixture of a cation-exchange resin and carbon particles is formed;
   (2) an adsorption step in which the no-catalyzed electrode is immersed in a solution comprising cations containing a catalyst metal element, thereby the cations are absorbed into the cation-exchange resin based on the ion-exchange reaction of the cations with counter ions of the cation-exchange resin;
   (3) a reduction step in which the cations adsorbed into the cation-exchange resin are reduced in a gaseous atmosphere comprising hydrogen gas resulting formation of the catalyst metal; and
   (4) an ageing step in which the catalyst metal is aged in an acid solution or alkaline solution or a gaseous atmosphere comprising an inert gas as the main component.

42. The process of claim 41, wherein at least one of the reduction step and the ageing step is conducted at a temperature of 200° C. or lower.

43. The process of claim 41, wherein the ageing step is conducted for 10 hours or longer.

44. The process of claim 41, wherein the cation-exchange resin has an ion-exchange capacity of 2.5 meq/g or lower.

45. The process of claim 41, which further comprises a step in which the cations unreduced are eluted with an inorganic acid after the reduction step.

46. A polymer electrolyte fuel cell comprising the following elements:
   (1) an anode,
   (2) a cathode, and
   (3) a solid polymer electrolyte film,
   wherein at least one of the anode and the cathode is the electrode for fuel cells of any one of claims 1, 2, 8, 4, 13, 14, 15, and 19–33 or the electrode for fuel cells produced by the process of any one of claims 37 to 45.

* * * * *